United States Patent
Willems et al.

(10) Patent No.: US 10,138,389 B2
(45) Date of Patent: Nov. 27, 2018

(54) AQUEOUS REACTION LIQUID COMPOSITION, INK SET COMPRISING SUCH AQUEOUS REACTION LIQUID COMPOSITION AND METHOD OF PRINTING USING SUCH AQUEOUS REACTION LIQUID COMPOSITION

(71) Applicant: Océ-Technologies B.V., Venlo (NL)

(72) Inventors: Guido G. Willems, Venlo (NL); Heidy A. J. M. Kuijpers, Venlo (NL)

(73) Assignee: OCÉ-TECHNOLOGIES B.V., Venlo (NL)

( * ) Notice: Subject to any disclaimer, the term of this patent is extended or adjusted under 35 U.S.C. 154(b) by 0 days.

(21) Appl. No.: 15/434,307

(22) Filed: Feb. 16, 2017

(65) Prior Publication Data
US 2017/0158899 A1    Jun. 8, 2017

Related U.S. Application Data

(63) Continuation of application No. PCT/EP2015/069623, filed on Aug. 27, 2015.

(30) Foreign Application Priority Data

Aug. 29, 2014 (EP) ..................... 14182860

(51) Int. Cl.
| | | |
|---|---|---|
| C09D 11/54 | (2014.01) | |
| C09D 11/322 | (2014.01) | |
| C09D 11/38 | (2014.01) | |
| C09D 11/40 | (2014.01) | |
| B41J 2/01 | (2006.01) | |

(52) U.S. Cl.
CPC .............. *C09D 11/54* (2013.01); *B41J 2/01* (2013.01); *C09D 11/322* (2013.01); *C09D 11/38* (2013.01); *C09D 11/40* (2013.01)

(58) Field of Classification Search
None
See application file for complete search history.

(56) References Cited

U.S. PATENT DOCUMENTS

| | | |
|---|---|---|
| 5,591,018 A | 1/1997 | Takeuchi et al. |
| 6,419,352 B1 | 7/2002 | Kubota et al. |
| 6,786,588 B2 | 9/2004 | Koyano et al. |
| 8,523,342 B2 | 9/2013 | Takaori et al. |
| 2002/0094939 A1 | 7/2002 | Sachdev et al. |
| 2011/0102497 A1* | 5/2011 | Sato ............. B41M 5/0017 347/21 |
| 2011/0303113 A1 | 12/2011 | Sarkisian et al. |
| 2012/0019588 A1 | 1/2012 | Mubarekyan |
| 2012/0098883 A1 | 4/2012 | Matsuyama et al. |
| 2012/0314000 A1 | 12/2012 | Sarkisian et al. |
| 2014/0055520 A1 | 2/2014 | Inumaru et al. |

FOREIGN PATENT DOCUMENTS

| | | |
|---|---|---|
| CN | 101709184 A | 5/2010 |
| EP | 0214868 A2 | 3/1987 |
| EP | 0790347 A2 | 8/1997 |
| EP | 2111998 A1 | 10/2009 |
| JP | 2014-111374 A | 6/2014 |
| WO | WO 00/41861 A1 | 7/2000 |
| WO | WO 01/72912 A2 | 10/2001 |
| WO | WO 2010/02707 A1 | 3/2010 |
| WO | WO 2013/131924 A1 | 9/2013 |
| WO | WO 2014/051547 A1 | 4/2014 |

OTHER PUBLICATIONS

Machine Translation of "Inkjet Recording Method" (JP 2014-111374 A), Koyanagi, Takashi et al., Jun. 19, 2014 Paragraphs 0025-0028, 0039, 0053, 0056-0058, 0067, and 0097, example 2].*
The Chemistry of Printing Inks and Their Electronics and Medical Applications, Section 3.5 Surfactants.*
IP.com search.*
International Search Report, issued in PCT/EP2015/069623, PCT/ISA/210, dated Sep. 30, 2015.
Search Report issued in European priority application 14182860, dated Feb. 3, 2015.
Written Opinion of the International Searching Authority, issued in PCT/EP2015/069623, PCT/ISA/237, dated Sep. 30, 2015.

* cited by examiner

*Primary Examiner* — Lisa M Solomon
(74) *Attorney, Agent, or Firm* — Birch, Stewart, Kolasch & Birch, LLP

(57) ABSTRACT

The present invention relates to an aqueous reaction liquid comprising a salt, a first surfactant being an amphoteric surfactant and a second surfactant being a non-ionic surfactant, preferably selected from the group consisting of hydrophilic silicones (such as polyalkylene oxide modified silicones/polyether modified silicones), alkoxylated alcohols, fluorosurfactants, polyether modified silicone surfactants and polyethyleneoxides. Reaction liquids according to the present invention show improved spreading on print substrates when applied, which is beneficial when the reaction liquid is applied by an ink jet method. The present invention further pertains to an ink set comprising such a reaction liquid and a method of printing using such an ink set.

20 Claims, No Drawings

AQUEOUS REACTION LIQUID COMPOSITION, INK SET COMPRISING SUCH AQUEOUS REACTION LIQUID COMPOSITION AND METHOD OF PRINTING USING SUCH AQUEOUS REACTION LIQUID COMPOSITION

CROSS-REFERENCE TO RELATED APPLICATIONS

This application is a Continuation of PCT/EP2015/069623, filed Aug. 27, 2015 and claims priority under 35 U.S.C. § 119(a) to Application No. 14182860.8, filed in Europe on Aug. 29, 2014. The entire contents of these applications are herein explicitly incorporated by reference.

FIELD OF THE INVENTION

The present invention relates to a reaction liquid suitable to be used in ink-jet printing, in particular a reaction liquid that is suitable to be applied onto a print substrate by means of an ink-jet imaging device.

BACKGROUND ART

In the field of ink jet printing, reaction liquids are used for improving print quality. The reaction liquid comprises a component that reacts with a component in the ink, e.g. the colloidal stability of dispersed pigment particles (present in the ink) is imparted by a metal salt (present in the reaction liquid). Therefore, upon contact between the ink composition and the reaction liquid, the dispersed pigment particles destabilize, agglomerate and are pinned to the print substrate. Therefore, (inter) color bleeding and coalescence on machine coated (MC) papers may be prevented, which is an improvement of the print quality. The optical density (OD) is increased and show-through is decreased on plain papers.

Reaction liquids are known from the prior art and usually comprise either a strong acidic compound or a (poly)valent metal salt, having the function of a fixer and/or crashing agent.

Reaction liquids, also termed reaction solutions, primer liquids, (pre-)treatment liquids or compositions, processing liquids or ink-receiving solutions, comprising polyvalent metal salts are known from the prior art, in particular from U.S. Pat. No. 6,419,352; U.S. Pat. No. 6,786,588; U.S. Pat. No. 8,523,342; U.S. Pat. No. 5,591,018; US 2011/0303113; US 2012/0098883; US 2012/0314000; and WO 2014/051547.

Published US Patent Application 2012/0019588 discloses fixer fluids, for ink-jet printing comprising a metal carboxylate salt as a fixer agent. In particular calcium acetate, calcium propionate, calcium butyrate, calcium bromide, calcium carbonate, calcium chloride, calcium citrate, calcium cyanamide, calcium phosphate, calcium lactate, calcium nitrate, calcium oxalate and calcium sulfate are disclosed as fixer agents.

Published US Patent Application 2014/0055520 discloses an ink-receiving solution comprising at least one metal salt, in particular calcium chloride.

The reaction liquids comprising a (poly)valent metal salt usually comprise a conjugate base of acids or a halide as an anion.

It is a disadvantage of the known reaction liquids that they show inferior spreading behavior on most commonly used print substrates, which makes them less suitable to be applied by in-line and off-line ink jet printing.

It is another disadvantage of the known reaction liquids that at high salt concentrations, required for enabling application of thin layers to a print substrate in order to prevent deformation of the print substrate by high liquid loading, the spreading behavior even gets worse, because commonly used surfactants lose their compatibility with the components of the reaction liquids at high salt contents.

It is therefore an object of the present invention to provide a reaction liquid comprising a metal salt content, which reaction liquid is suitable to be applied in thin layers by ink-jet printing and shows improved spreading behavior.

SUMMARY OF THE INVENTION

This object is at least partly attained by an aqueous reaction liquid composition comprising a metal salt, a first surfactant being an amphoteric surfactant and a second surfactant being a non-ionic surfactant. The non-ionic surfactant is preferably selected from the group consisting of hydrophilic silicones (such as polyalkylene oxide modified silicones/polyether modified silicones), alkoxylated alcohols, fluorosurfactants, polyether modified silicone surfactants and polyethyleneoxides.

The inventors have surprisingly found that the compatibility of commonly used surfactants with the reaction liquid improves by adding an amphoteric surfactant to the aqueous reaction liquid composition and that the commonly used surfactant in combination with the amphoteric surfactant improves the spreading behavior with respect to reaction liquids comprising an amphoteric surfactant as a single surfactant.

In an embodiment, the amphoteric surfactant is selected from the group consisting of cocamidopropylenebetaine, lauryldimethylamine oxide, larylbetaine, stearylbetaine, hydroxysultains, sodiumcocoamphopropionate and dipropionate amphoteric (e.g. TOMAMINE®, manufactured by Air Products) surfactants.

In an embodiment the dipropionate amphoteric surfactant (TOMAMINE®) has a structure according to the following formula:

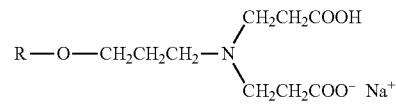

wherein:

R represents a lipophilic group, preferably a $C_4$-$C_{25}$ linear alkyl group.

In an embodiment, the first (i.e., amphoteric) surfactant is present in an amount of between 0.5 wt % and 5 wt %, preferably between 1 wt % and 4 wt % and more preferably between 1.5 wt % and 3 wt %, relative to the total aqueous reaction liquid composition.

In an embodiment, the second surfactant (i.e., non-ionic) is present in an amount of between 0.1 wt % and 2 wt %, preferably between 0.3 wt % and 1.5 wt %, more preferably between 0.5 wt % and 1 wt %, relative to the total aqueous reaction liquid composition.

In an embodiment, the mass ratio of the first surfactant relative to the second surfactant is between 1 and 6, preferably between 1.5 and 5, more preferably between 2 and 4.

In an embodiment, the metal salt comprises a salt of a conjugate base of an organic acid.

In an embodiment, the organic acid is selected from formic acid and organic acids comprising at least one stereogenic center and having a molecular weight of below 200 g/mol.

In an embodiment, the organic acid is an amino acid.

In an embodiment, the metal salt comprises a metal ion as a cation, preferably a polyvalent metal ion, more preferably selected from the group consisting of: $Ca^{2+}$, $Mg^{2+}$, $Sr^{2+}$, $Zn^{2+}$, $Cu^{2+}$, $Ni^{2+}$, $Fe^{3+}$, $Cr^{3+}$ and $Al^{3+}$. $Mg^{2+}$ and $Ca^{2+}$ are most preferred for health, safety and environment (HSE) reasons.

In an embodiment, the organic acid is selected from the group consisting of formic acid, ascorbic acid, glutamic acid and pidolic acid. Of these, formic acid is the least preferred because of its smell.

In an embodiment, the metal salt comprises Mg-pidolate or Ca-pidolate. These are HSE-friendly, non-corrosive and non-smelling.

In another aspect the present invention pertains to an ink set comprising an aqueous reaction liquid composition as described above and an ink composition comprising dispersed particles that destabilize (and preferably agglomerate) upon contact with the polyvalent metal salt comprised in the reaction liquid.

In an embodiment, the dispersed particles comprised in the ink composition comprise pigment particles.

In an embodiment, the dispersed particles comprised in the ink composition comprise latex particles.

In yet another aspect, the present invention pertains to a method of printing comprising the steps of:

applying an aqueous reaction liquid composition of the present invention to a surface of the print substrate; and applying an ink composition to a surface of the print substrate, wherein the ink composition comprises dispersed particles that destabilize upon contact with the metal salt in the aqueous reaction liquid composition.

In an embodiment, the aqueous reaction liquid composition is first applied to the surface of the print substrate and subsequently the ink composition is applied to the surface of the print substrate.

In an embodiment, the aqueous reaction liquid composition is applied by ink jet.

In an embodiment, the aqueous reaction liquid composition is applied to the surface of the print substrate in a pattern.

In an embodiment, the aqueous reaction liquid composition is applied to the surface of the print substrate in accordance with an image to be formed by subsequently printing the ink composition.

In an embodiment, the ink composition is imagewise applied by ink jet.

The present invention will become more fully understood from the detailed description given herein below and the examples which are given by way of illustration only and are not limitative of the invention.

DETAILED DESCRIPTION

Aqueous Reaction Liquid Composition

Aqueous reaction liquid compositions according to the present invention comprise a metal salt, preferably a metal salt of an organic acid; a first surfactant being an amphoteric surfactant and a second surfactant being a non-ionic surfactant. The second surfactant may be selected from the group consisting of alkoxylated alcohols, fluorosurfactants, hydrophilic silicone surfactants (such as polyalkylene oxide modified silicones/polyether modified silicones) and polyethyleneoxides. The aqueous reaction liquid composition may also contain water. Aqueous reaction liquid compositions may comprise additives, such as cosolvents and pH-regulators. Aqueous reaction liquid compositions according to the present invention can be suitably used on plain papers and machine coated (MC) papers, which are well known in the art.

Metal Salts

Metal salts that can be suitably used in aqueous reaction liquid compositions according to the present invention may comprise monovalent metal ions, such as $Li^+$, $Na^+$, $K^+$, $Hg^+$, $Cu^+$ and $Ag^+$. However, it is preferred that thin layers of the reaction liquid can be applied to a print substrate, in order to prevent deformation of the print substrate (in particular paper-like substrates). Therefore, in order to provide an effective reaction liquid in thin layers, a salt providing a relatively high ionic strength is preferred.

In the context of the present invention, ionic strength is defined in accordance with equation 1:

$$i = \frac{1}{2} \times \sum_{i=1}^{n} (c_i \times z_i^2) \qquad \text{equation 1}$$

wherein:
I is the ionic strength in M (i.e. mol/l);
$c_i$ is the concentration of ion i;
$z_i$ is the valence of ion i;

For example, the ionic strength of a 0.5 mol/l $Na_2SO_4$ solution is:

$$0.5*(2*0.5*(1)^2+1*0.5*(-2)^2)=1.5 \text{ M}$$

Another criterion to be observed is that the solubility of the selected salt is high enough to be able to prepare an effective reaction solution. For these reasons, polyvalent metal ions are preferred, such as: $Ca^{2+}$, $Mg^{2+}$, $Sr^{2+}$, $Zn^{2+}$, $Cu^{2+}$, $Ni^{2+}$, $Fe^{3+}$, $Cr^{3+}$ and $Al^{3+}$. Of these, $Mg^{2+}$ and $Ca^{2+}$ are most preferred for HSE reasons.

By using acid-like anions the selected cation can be used at a pH of above 7, without precipitation. The soluble salts of such acids (in particular the amino acids) are suitable to be used for ink-jet application of the reaction liquid Due to their relatively high solubility, reaction solutions comprising high salt contents can be obtained. Therefore, thin layers can be applied to obtain an effective salt content on the print substrate (0.2-1.5 g/m² reaction liquid). As described above, application of thin layers of reaction solution contributes to the reducing or preventing deformation of the print substrate, due to the fact that less liquid needs to be applied to the print substrate. Examples of suitable anions are (but not limited to): formate (formic acid), ascorbate (ascorbic acid), glutamate (glutamic acid), pidolate (pidolic acid), taurate (taurine), aspartate (aspartic acid), asparaginate (asparagine), glycinate (glycine), arginate (arginine).

In the context of the present invention, the most preferred polyvalent metal salts are magnesium pidolate and calcium pidolate. The use of these salts in reaction liquids provides the most effective, HSE-friendly, non-corrosive, non-smelling reaction liquid.

In general, the aqueous reaction liquid compositions according to the present invention comprise between 10 wt % and 60 wt %, preferably between 15 w % and 50 wt %, more preferably between 20 wt % and 40 wt % of the metal salt (preferably multivalent metal salt), with reference to the total composition. The amount of salt is however limited to the maximum solubility of the salt. The saturation degree (actual concentration/maximum solubility*100%) of the salt in the reaction liquid is in general between 10% and 100%, preferably between 15% and 95%, more preferably between 20% and 80%.

Cosolvents

In order to meet jettability requirements, cosolvents may be added to the reaction liquid. Cosolvents may have multiple functions, e.g. adapting the rheological behavior of the aqueous reaction liquid composition and/or preventing drying of the aqueous reaction liquid composition in the imaging device or on the nozzle surface of the imaging device, which drying may lead to precipitation of the metal salt in the imaging device or on the nozzle plate. Cosolvents may also be used to improve penetration of the main solvent (water) into the print substrate, such cosolvents are also termed penetrants. The type of cosolvents used is not limited to any kind, as long as the effect of the present invention is preserved. Cosolvents similarly used in (aqueous) ink compositions may be suitably used in aqueous reaction liquid compositions according to the present invention. Examples of suitable cosolvents are water-soluble organic solvents such as polyhydric alcohols, polyhydric alcohol alkyl ethers, polyhydric alcohol aryl ethers, nitrogen-containing heterocyclic compounds, amides, amines, ammonium compounds, sulfur-containing compounds, propylene carbonate, and ethylene carbonate.

Examples of water-soluble organic solvents include (but are not limited to): glycerin (also termed glycerol), propylene glycol, dipropylene glycol, tripropylene glycol, tetrapropylene glycol, polypropylene glycol, ethylene glycol, diethylene glycol, triethylene glycol, tetraethylene glycol, polyethylene glycols preferably having a molecular weight of between 200 gram/mol and 1000 gram/mol (e.g. PEG 200, PEG 400, PEG 600, PEG 800, PEG 1000), glycerol ethoxylate, petaerythritol ethoxylate, polyethylene glycol (di)methylethers preferably having a molecular weight of between 200 gram/mol and 1000 gram/mol, tri-methylolpropane, diglycerol (diglycerin), trimethylglycine (betaine), N-methylmorpholine N-oxide, decaglyserol, 1,4-butanediol, 1,3-butanediol, 1,2,6-hexanetriol, 2-pyrrolidinone, dimethylimidazolidinone, ethylene glycol mono-butyl ether, diethylene glycol monomethyl ether, diethylene glycol monoethyl ether, diethylene glycol mono-propyl ether, diethylene glycol mono-butyl ether, triethylene glycol monomethyl ether, triethylene glycol monoethyl ether, triethylene glycol mono-propyl ether, triethylene glycol mono-butyl ether, tetraethylene glycol monomethyl ether, tetraethylene glycol monoethyl ether, propylene glycol mono-butyl ether, dipropylene glycol monomethyl ether, dipropylene glycol monoethyl ether, dipropylene glycol monopropyl ether, diethylene glycol monobutyl ether, tripropylene glycol monomethyl ether, tripropylene glycol monoethyl ether, tripropylene glycol monopropyl ether, tripropylene glycol monobutyl ether, tetrapropylene glycol monomethyl ether, diethylene glycol diethyl ether, diethylene glycol dibutyl ether, triethylene glycol diethyl ether, triethylene glycol dibutyl ether, dipropylene glycol dibutyl ether, tri propylene glycol dibutyl ether, 3-methyl 2,4-pentanediol, diethylene-glycol-monoethyl ether acetate, 1,2-hexanediol, 1,2-pentanediol and 1,2-butanediol.

In an embodiment, a mixture of the water-soluble organic solvents may be comprised in an aqueous reaction liquid composition according to the present invention. The individual organic solvents preferably being present in an amount of 1 weight % to 40 weight %, more preferably in an amount of 3 weight % to 30 weight %, even more preferably in an amount of 5 weight % to 20 weight %, relative to the total aqueous reaction liquid composition.

PH-regulators pH-regulators may be added to the aqueous reaction liquid composition to optimize the solubility of the metal salt. In general, the metal salts used in a reaction liquid in accordance with the present invention show optimal solubility at a pH>7. Therefore, alkaline pH-regulators are preferred. Examples of suitable pH-regulators are (but are not limited to): ammonia, (secondary and tertiary) amines, amino alcohols, in particular N-alkyl-dialkanolamines. Specific examples of suitable amino alcohols are: triethanolamine, N-metyldiethanolamine, N-ethyldiethanolamine, N-n-butyl-monoethanolamine and N-n-butyl-diethanolamine.

Usually pH-regulators are present in a small amount in the aqueous reaction liquid composition, in particular less than 1 wt % with respect to the total reaction liquid composition. However, pH-regulators can be suitably applied in any amount until the desired pH has been reached and as long as the effect of the present invention is preserved.

Surfactants

Surfactants may be added to the reaction liquid to improve the spreading behavior of the aqueous reaction liquid composition on the print substrate.

Examples of the surfactant include nonionic surfactants, cationic surfactants, anionic surfactants, amphoteric surfactants, in particular betaine surfactants, silicone surfactants, and fluorochemical surfactants. Particularly, at least one selected from acetylene surfactants, silicone surfactants and fluorochemical surfactants.

Examples of a cationic surfactant include: aliphatic amine salts, aliphatic quaternary ammonium salts, benzalkonium salts, benzethonium chloride, pyridinium salts, and imidazolinium salts.

Examples of an anionic surfactant include: polyoxyethylene alkylether acetic acid salts, dodecylbenzene sulfonic acid salts, lauric acid salts, and salts of polyoxyethylene alkylether sulfate, an aliphatic acid soap, an N-acyl-N-methyl glycin salt, an N-acyl-N-methyl-β-alanine salt, an N-acylglutamate, an acylated peptide, an alkylsulfonic acid salt, an alkylbezenesulfonic acid salt, an alkylnaphthalenesulfonic acid salt, a dialkylsulfo succinate (e.g. sodium dioctyl sulfosuccinate (DSS); alternative names: docusate sodium, Aerosol OT and AOT), alkylsulfo acetate, α-olefin sulfonate, N-acyl-methyl taurine, a sulfonated oil, a higher alcohol sulfate salt, a secondary higher alcohol sulfate salt, an alkyl ether sulfate, a secondary higher alcohol ethoxysulfate, a polyoxyethylene alkylphenyl ether sulfate, a monoglysulfate, an aliphatic acid alkylolamido sulfate salt, an alkyl ether phosphate salt and an alkyl phosphate salt.

Examples of an amphoteric surfactant include: a carboxybetaine type, a sulfobetaine type, an aminocarboxylate salt and an imidazolium betaine.

Examples of a nonionic surfactant include: polyoxyethylene alkylether, polyoxypropylene polyoxyethylene alkylether, a polyoxyethylene secondary alcohol ether, a polyoxyethylene alkylphenyl ether, a polyoxyethylene sterol ether, a polyoxyethylenelanolin derivative polyoxyethylene polyoxypropylene alkyl ether, polyoxyethylene alkylester, a polyoxyethyleneglycerine aliphatic acid ester, a polyoxyethylene castor oil, a hydrogenated castor oil, a polyoxyethylene sorbitol aliphatic acid ester, a polyethylene glycols aliphatic acid ester, an aliphatic acid monoglyceride, a polyglycerine aliphatic acid ester, a sorbitan aliphatic acid ester, polyoxyethylene sorbitan aliphatic acid ester, a propylene glycol aliphatic acid ester, a cane sugar aliphatic acid ester, an aliphatic acid alkanol amide, polyoxyethylene alkylamide, a polyoxyethylene aliphatic acid amide, a polyoxyethylene alkylamine, an alkylamine oxide, an alkoxylated alcohol, an acetyleneglycol, an ethoxylated acetylene glycol, acetylene alcohol.

As the fluorochemical surfactant, a surfactant having 2 to 16 fluorine-substituted carbon atoms is preferred, and a surfactant having 4 to 16 fluorine-substituted carbon atoms is more preferred. When the number of fluorine-substituted carbon atoms is less than 2, the effect peculiar to a fluorochemical surfactant may not be obtained. When it is more than 16, degradation in storage stability etc. may arise.

Examples of the fluorochemical surfactants include nonionic fluorochemical surfactants, anionic fluorochemical surfactants, and amphoteric fluorochemical surfactants.

Examples of the nonionic fluorochemical surfactants include perfluoroalkyl phosphoric acid ester compounds, perfluoroalkyl ethylene oxide adducts, and polyoxyalkylene ether polymer compounds having perfluoroalkyl ether groups as side chains. Among these, polyoxyalkylene ether polymer compounds having perfluoroalkyl ether groups as side chains are preferable because they are low in foaming property.

As the fluorochemical surfactants, commercially available products may be used.

Examples of the commercially available products include SURFLON® S-HI, S-112, S-113. S-121, S-131, S-132, S-141 and S-145 (all of which are produced by Asahi Glass Co., Ltd.), FLUORAD® FC-93, FC-95, FC-98, FC-129, FC-135, FC-170C, FC-430 and FC-431 (all of which are produced by Sumitomo 3M Limited), MEGAFAC® F-470, F-1405 and F-474 (all of which are produced by Dainippon Ink Chemical Industries Co., Ltd.), ZONYL® TBS, FSP, FSA, FSN-100, FSN, FSO-100, FSO, FS-300 and UR (all of which are produced by E. I. du Pont de Nemours and Company), FT-110, FT-250, FT-251, FT-400S, FT-150 and FT-400SW (all of which are produced by Neos Company Limited), and POLYFOX® PF-136A, PF-156A, PF-151N, PF-154, and PF-159 (all of which are produced by OMNOVA Solutions Inc.). Among these, ZONYL® FS-300 (produced by E. I. du Pont de Nemours and Company), FT-110, FT-250, FT-251, FT-400S, FT-150, FT-400SW (produced by Neos Company Limited), and POLYFOX® PF-151N (produced by OMNOVA Solutions Inc.) are preferable in that they are excellent in print quality, particularly in color developing ability and in dye-leveling property.

The silicone surfactant is not particularly limited and may be suitably selected in accordance with the intended use.

Examples of the silicone surfactant include side-chain-modified polydimethylsiloxane, both-ends-modified polydimethylsiloxane, one-end-modified polydimethylsiloxane, and side-chain/both-ends-modified polydimethylsiloxane. Polyether-modified silicone surfactants having, as a modified group, a polyoxyethylene group or a polyoxyethylene polyoxypropylene group are particularly preferable because they exhibit excellent physical properties as water-based surfactants.

The silicone surfactant may be suitably synthesized or commercial products may be used. The commercial product is readily available from BYK Chemie GmbH, Shin-Etsu Chemical Co., Ltd., TORAY Dow Corning Silicone Co., Ltd., Nihon Emulsion Co., Ltd., Kyoeisha Chemical Co., Ltd., or the like.

The polyether-modified silicone surfactant is not particularly limited and may be suitably selected in accordance with the intended use. Examples thereof include a compound in which a polyalkylene oxide structure represented by Formula 1 is induced in Si portion side chain of dimethyl polysiloxane.

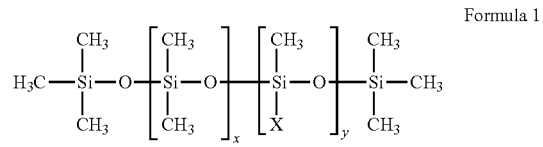

Formula 1 wherein $X=\!\!-\!\!R(C_2H_4O)_a(C_3H_6O)_bR'$

In Formula 1, x, y, a and b are each an integer; R represents an alkyl group, and R' represents an alkylene group.

As the polyether-modified silicone surfactant/polyalkylene oxide modified silicone, commercial products may be used.

Examples of the commercial products include KF-618, KF-642 and KF-643 (produced by Shin-Etsu Chemical Co., Ltd.); EMALEX-SS-5602 and SS-1906EX (produced by Nihon Emulsion Co., Ltd.); FZ-2105, FZ-2118, FZ-2154, FZ-2161, FZ-2162, FZ-2163 and FZ-2164 (produced by TORAY Dow Corning Silicone Co., Ltd.); and BYK-33, BYK 331, BYK 341, BYK 348, BYK 349, BYK 3455, BYK-387 (produced by BYK Chemie GmbH); Tegowet 240, Tegowet 245, Tegowet 250, Tegowet 260 (produced by Evonik); Silwet L-77 (produced by Sabic), DBE 714 surfactant.

All surfactants mentioned in this section may be used solely, or they may be used in combination of the plural.

Ethoxylated acetylene glycols (an example of alkoxylated alcohols) have a general structure as shown in Formula 2.

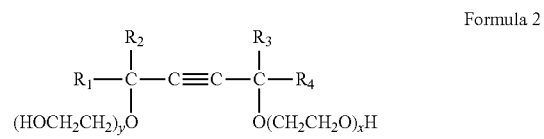

Formula 2

Wherein $R_1$ and $R_4$ are the same or different alkyl radicals having from 3-10, preferably from 3-6 carbon atoms, preferably $R_1$ and $R_4$ are the same and $R_2$ and $R_3$ are the same or different and selected from methyl and ethyl, preferably both $R_2$ and $R_3$ are methyl and x and y are both integers and have a sum in the range of between 1 and 60.

In an embodiment, an ethoxylated acetylene glycol according to Formula 2 is used as a surfactant alone or in combination with other surfactants in an ink composition according to the present invention, wherein x and y are independent of one another and each are in a range of between 0 and 25, preferably between 0 and 20, more preferably between 0 and 15, with the proviso that at least one of x and y is larger the 0.

Specific examples of ethoxylated acetylene glycols are ethoxylated 3-methyl-1-nonyn-3-ol, ethoxylated 7,10-dimethyl-8-hexadecyne-7,10-diol, ethoxylated 4,7-dimethyl-5- decyne-4,7-diol, ethoxylated 2,4,7,9-tetramethyl-5-decyne-4,7-diol, and ethoxylated 2,5,8,11-tetramethyl-6-dodecyne-5,8-diol. These can be used in combination with each other.

The inventors have surprisingly found that the first surfactant being an amphoteric surfactant present in the aqueous reaction liquid composition enables the addition of a second surfactant, preferably being a non-ionic surfactant, preferably selected from the group consisting of hydrophilic silicones (such as polyalkylene oxide modified silicones/polyether modified silicones), alkoxylated alcohols, fluoro-surfactants, polyether modified silicone surfactants and polyethyleneoxides (all exemplified above), even if such second surfactant is not compatible with the aqueous reaction liquid composition when used alone (e.g. due to high salt content of the reaction liquid). The amphoteric surfactant therefore acts as a compatibilizer for the second surfactant and the surface tension of the reaction liquid can be suitably adapted in order to improve the wettability of a recording substrate (including machine coated papers) with the reaction liquid. A result may be that the spreading of the aqueous reaction liquid composition on the print substrate may thus be improved, which is very favorable when it is desired to apply (very) thin layers of the aqueous reaction liquid composition.

Inks

Any ink composition comprising dispersed particles that destabilize (preferably agglomerate) upon contact with the metal salt comprised in the aqueous reaction liquid composition can be suitably used in combination with an aqueous reaction liquid composition according to the present invention. The dispersed particles may be colorant particles, in particular pigment particles, and/or latex particles. Examples of suitable inks are aqueous pigmented inks and latex inks, wherein the particles present in the ink (e.g. pigment particles and/or latex particles) are sensitive to reacting with the metal salts present in the primer compositions according to the present invention. Such ink compositions are for example disclosed in the published International Patent Application WO2013/131924, in particular in the Examples and the cited prior art, which are hereby incorporated by reference.

Colorant

The colorant particles may be a pigment or a mixture of pigments, a dye or a mixture of dyes or a mixture comprising pigments and dyes, as long as the colorant is water-dispersed.

Examples of the pigment usable in the present invention include those commonly known without any limitation, and either a water-dispersed pigment or an oil-dispersed pigment is usable. For example, an organic pigment such as an insoluble pigment or a lake pigment, as well as an inorganic pigment such as carbon black, is preferably usable.

Examples of the insoluble pigments are not particularly limited, but preferred are an azo, azomethine, methine, diphenylmethane, triphenylmethane, quinacridone, anthraquinone, perylene, indigo, quinophthalone, isoindolinone, isoindoline, azine, oxazine, thiazine, dioxazine, thiazole, phthalocyanine, or diketopyrrolopyrrole dye.

For example, inorganic pigments and organic pigments for black and color inks are exemplified. These pigments may be used alone or in combination.

As the inorganic pigments, it is possible to use carbon blacks produced by a known method such as a contact method, furnace method and thermal method, in addition to titanium oxide, iron oxide, calcium carbonate, barium sulfate, aluminum hydroxide, barium yellow, cadmium red and chrome yellow.

As the organic pigments, it is possible to use azo pigments (including azo lake, insoluble azo pigments, condensed pigments, chelate azo pigments and the like), polycyclic pigments (e.g., phthalocyanine pigments, perylene pigments, perynone pigments, anthraquinone pigments, quinacridone pigments, dioxazine pigments, indigo pigments, thioindigo pigments, isoindolinone pigments, and quinophthalone pigments), dye chelates (e.g., basic dye type chelates, and acidic dye type chelates), nitro pigments, nitroso pigments, aniline black. Among these, particularly, pigments having high affinity with water are preferably used.

Specific pigments which are preferably usable are listed below.

Examples of pigments for magenta or red include: C.I. Pigment Red 1, C.I. Pigment Red 2, C.I. Pigment Red 3, C.I. Pigment Red 5, C.I. Pigment Red 6, C.I. Pigment Red 7, C.I. Pigment Red 15, C.I. Pigment Red 16, C.I. Pigment Red 17, C.I. Pigment Red 22, C.I. Pigment Red 23, C.I. Pigment Red 31, C.I. Pigment Red 38, C.I. Pigment Red 48:1, C.I. Pigment Red 48:2 (Permanent Red 2B(Ca)), C.I. Pigment Red 48:3, C.I. Pigment Red 48:4, C.I. Pigment Red 49:1, C.I. Pigment Red 52:2; C.I. Pigment Red 53:1, C.I. Pigment Red 57:1 (Brilliant Carmine 6B), C.I. Pigment Red 60:1, C.I. Pigment Red 63:1, C.I. Pigment Red 64:1, C.I. Pigment Red 81. C.I. Pigment Red 83, C.I. Pigment Red 88, C.I. Pigment Red 101 (colcothar), C.I. Pigment Red 104, C.I. Pigment Red 106, C.I. Pigment Red 108 (Cadmium Red), C.I. Pigment Red 112, C.I. Pigment Red 114, C.I. Pigment Red 122 (Quinacridone Magenta), C.I. Pigment Red 123, C.I. Pigment Red 139, C.I. Pigment Red 44, C.I. Pigment Red 146, C.I. Pigment Red 149, C.I. Pigment Red 166, C.I. Pigment Red 168, C.I. Pigment Red 170, C.I. Pigment Red 172, C.I. Pigment Red 177, C.I. Pigment Red 178, C.I. Pigment Red 179, C.I. Pigment Red 185, C.I. Pigment Red 190, C.I. Pigment Red 193, C.I. Pigment Red 209, C.I. Pigment Red 219 and C.I. Pigment Red 222, C.I. Pigment Violet 1 (Rhodamine Lake), C.I. Pigment Violet 3, C.I. Pigment Violet 5:1, C.I. Pigment Violet 16, C.I. Pigment Violet 19, C.I. Pigment Violet 23 and C.I. Pigment Violet 38.

Examples of pigments for orange or yellow include: C.I. Pigment Yellow 1, C.I. Pigment Yellow 3, C.I. Pigment Yellow 12, C.I. Pigment Yellow 13, C.I. Pigment Yellow 14, C.I. Pigment Yellow 15, C.I. Pigment Yellow 15;3, C.I. Pigment Yellow 17, C.I., Pigment Yellow 24, C.I. Pigment Yellow 34, C.I. Pigment Yellow 35, C.I. Pigment Yellow 37, C.I. Pigment Yellow 42 (yellow iron oxides), C.I. Pigment Yellow 53, C.I. Pigment Yellow 55, C.I. Pigment Yellow 74, C.I. Pigment Yellow 81, C.I. Pigment Yellow 83, C.I. Pigment Yellow 93, C.I. Pigment Yellow 94, C.I. Pigment Yellow 95, C.I. Pigment Yellow 97, C.I. Pigment Yellow 98, C.I. Pigment Yellow 100, C.I. Pigment Yellow 101, C.I. Pigment Yellow 104, C.I. Pigment Yellow 408, C.I. Pigment Yellow 109, C.I. Pigment Yellow 110, C.I. Pigment Yellow 117, C.I. Pigment Yellow 120, C.I. Pigment Yellow 128, C.I. Pigment Yellow 138, C.I. Pigment Yellow 150, C.I. Pigment Yellow 151, C.I. Pigment Yellow 153 and C.I. Pigment Yellow 183; C.I. Pigment Orange 5, C.I. Pigment Orange 13, C.I. Pigment Orange 16, C.I. Pigment Orange 17, C.I. Pigment Orange 31, C.I. Pigment Orange 34, C.I. Pigment Orange 36, C.1. Pigment Orange 43, and C.I. Pigment Orange 51.

Examples of pigments for green or cyan include: C.I. Pigment Blue 1, C.I. Pigment Blue 2, 0.1. Pigment Blue 15, C.I. Pigment Blue 15:1, C.I. Pigment Blue 15:2, C.I. Pigment Blue 15:3 (Phthalocyanine Blue), C.I. Pigment Blue 16, C.I. Pigment Blue 17:1, C.I. Pigment Blue 56, C.I. Pigment Blue 60, C.I. Pigment Blue 63, C.I. Pigment Green 1, C.I. Pigment Green 4, C.I. Pigment Green 7, C.I. Pigment Green 8, C.I. Pigment Green 10, C.I. Pigment Green 17, C.I. Pigment Green 18 and C.I. Pigment Green 36.

In addition to the above pigments, when red, green, blue or intermediate colors are required, it is preferable that the following pigments are employed individually or in combination thereof. Examples of employable pigments include: C.I. Pigment Red 209, 224, 177, and 194, C.I. Pigment Orange 43, C.I. Vat Violet 3, C.I. Pigment Violet 19, 23, and 37, C.I. Pigment Green 36, and 7, C.I. Pigment Blue 15:6.

Further, examples of pigments for black include: C.I. Pigment Black 1, C.I. Pigment Black 6, C.I. Pigment Black 7 and C.I. Pigment Black 11. Specific examples of pigments for black color ink usable in the present invention include carbon blacks (e.g., furnace black, lamp black, acetylene black, and channel black); (C.I. Pigment Black 7) or metal-based pigments (e.g., copper, iron (C.I. Pigment Black 11), and titanium oxide; and organic pigments (e.g., aniline black (C.I. Pigment Black 1).

The amount of the water-insoluble pigment contained in the ink (e.g., inkjet ink), as a solid content, is preferably 0.5 weight % to 15 weight %, more preferably 0.8 weight % to 10 weight %, and even more preferably between 1 weight % and 6 weight % relative to the total ink composition. When the amount of the water-insoluble pigment is less than 0.5 weight %, the color developing ability and image density of the ink may degrade.

When it is more than 15 weight %, unfavorably, the viscosity of the ink is increased, causing a degradation in ink ejection stability.

Latex Particles

The ink (e.g., inkjet ink) present in an ink set according to the present invention may contain a water-dispersed resin (latex resin) in view of the pigment fixability to recording media. As the water-dispersed resin, a water-dispersed resin excellent in film formability (image formability) and having high water repellency, high waterfastness, and high weatherability is useful in recording images having high waterfastness and high image density (high color developing ability).

Examples of the water-dispersed resin include synthetic resins and natural polymer compounds.

Examples of the synthetic resins include polyester resins, polyurethane resins, polyepoxy resins, polyamide resins, polyether resins, poly(meth)acrylic resins, acryl-silicone resins, fluorine-based resins, polyolefin resins, polystyrene-based resins, polybutadiene-based resins, polyvinyl acetate-based resins, polyvinyl alcohol-based resins, polyvinyl ester-based resins, polyvinyl chloride-based resins, polyacrylic acid-based resins, unsaturated carboxylic acid-based resins and copolymers such as styrene-acrylate copolymer resins, styrene-butadiene copolymer resins.

Examples of the natural polymer compounds include celluloses, rosins, and natural rubbers.

In an embodiment, the water dispersed resin used in the present invention may be made of a resin having a water soluble functional group such as a carboxylic group or a sulfonic group.

In an embodiment, the ink composition according to the present invention comprises a resin having a carboxylic group which has a small dissociation rate from the viewpoint of producing high speed aggregation effect of the water-dispersed resin. Since a carboxylic acid group tends to be influenced by a pH change, a dispersion state changes easily and its aggregation property is high. Examples of resins suitable for use in ink compositions according to the present embodiment are: an acrylic resin, a vinyl acetate resin, a styrene butadiene resin, a vinyl chloride resin, an acrylic styrene resin, a butadiene resin and styrene resin. As for the resin component of the water-dispersed resin, it is preferable that it is a polymer having both a hydrophilic portion and a hydrophobic part in the molecule. By having a hydrophobic part, it is possible that a hydrophobic part will be orientated to the inside of the water-dispersed resin, and a hydrophilic portion will be effectively orientated to the outside of the water-dispersed resin. As a result, the change of a dispersion state in response to the pH change of a liquid will become larger, and aggregation of the ink will be performed more efficiently.

Examples of commercially available water-dispersed resin emulsions include: Joncryl 537 and 7640 (styrene-acrylic resin emulsion, made by Johnson Polymer Co., Ltd.), Microgel E-1002 and E-5002 (styrene-acrylic resin emulsion, made by Nippon Paint Co., Ltd.), Voncoat 4001 (acrylic resin emulsion, made by Dainippon Ink and Chemicals Co., Ltd.), Voncoat 5454 (styrene-acrylic resin emulsion, made by Dainippon Ink and Chemicals Co., Ltd.), SAE-1014 (styrene-acrylic resin emulsion, made by Zeon Japan Co., Ltd.), Jurymer ET-410 (acrylic resin emulsion, made by Nihon Junyaku Co., Ltd.), Aron HD-5 and A-104 (acrylic resin emulsion, made by Toa Gosei Co., Ltd.), Saibinol SK-200 (acrylic resin emulsion, made by Saiden Chemical Industry Co., Ltd.), and Zaikthene L (acrylic resin emulsion, made by Sumitomo Seika Chemicals Co., Ltd.), acrylic copolymer emulsions of DSM Neoresins, e.g. the NeoCryl product line, in particular acrylic styrene copolymer emulsions NeoCryl A-662, NeoCryl A-633 NeoCryl A-1131, NeoCryl A-2091, NeoCryl A-550, NeoCryl BT-101, NeoCryl SR-270, NeoCryl XK-52, NeoCryl XK-39, NeoCryl XK-205, NeoCryl A-1044, NeoCryl A-1049, NeoCryl A-1110, NeoCryl A-1120, NeoCryl A-1127, NeoCryl A-2092, NeoCryl A-2099, NeoCryl A-308, NeoCryl A-45, NeoCryl A-615, NeoCryl BT-24, NeoCryl BT-26, NeoCryl BT-36, NeoCryl XK-15, NeoCryl X-151, NeoCryl XK-232, NeoCryl XK-234, NeoCryl XK-237, NeoCryl XK-238-NeoCryl XK-86, NeoCryl XK-90 and NeoCryl XK-95 However, the water-dispersed resin emulsion is not limited to these examples.

As the fluorine-based resin, fluorine-based resin fine particles having a fluoroolefin unit are preferred. Of these, fluorine-containing resin fine particles containing a fluoroolefin unit and a vinylether unit are particularly preferable. The fluoroolefin unit is not particularly limited and may be suitably selected in accordance with the intended use. Examples thereof include —$CF_2CF_2$—, —$CF_2CF(CF_3)$—, and —$CF_2CFCl$—.

The vinylether unit is not particularly limited and may be suitably selected in accordance with the intended use. Examples thereof include —$C(R_a)HC(OR_b)$—; wherein $R_a$ is a hydrogen atom or a methyl group; and wherein $R_b$ may be selected from the group consisting of —$CH_2R_c$, —$C_2H_4R_c$, —$C_3H_6R_c$, —$C_4H_8R_c$, and —$C_5H_{10}R_c$, wherein $R_c$ is selected from the group consisting of a hydrogen atom (—H), an hydroxy group (—OH) or a carboxylic acid group (—COOH)

As the fluorine-containing vinylether-based resin fine particles containing a fluoroolefin unit and a vinylether unit, an alternated copolymer, in which the fluoroolefin unit and the vinylether unit are alternately copolymerized, is preferable. As such a fluorine-based resin fine particles, a suitably synthesized compound may be used and a commercially available product may be used. Examples of the commercially available products include FLUONATE FEM-500 and FEM-600, DICGUARD F-52S, F-90, F-90M, F-90N and AQUAFURFURAN TE-5A produced by Dainippon Ink Chemical Industries Co., Ltd.; LUMIFLON FE4300, FE4500, FE4400, ASAHI GUARD AG-7105, AG-950, AG-7600, AG-7000, and AG-1100 produced by Asahi Glass Co., Ltd.

The water-dispersed resin may be used in the form of a homopolymer, a copolymer or a composite resin, and all of water-dispersed resins having a monophase structure or core-shell structure and those prepared by power-feed emulsion polymerization may be used.

As the water-dispersed resin, it is possible to use a resin which in itself has a hydrophilic group and hence has a certain degree of self-dispersibility, and a resin which in itself has no dispersibility but to which the dispersibility is imparted with use of a surfactant and/or another resin having a hydrophilic group. Among these resins, an emulsion of a resin obtained by emulsion polymerization or suspension polymerization of an ionomer of a polyester resin or a polyurethane resin is most suitably used. In the case of emulsion polymerization of an unsaturated monomer, a resin dispersion is obtained by initiating a polymerization reaction in the dispersed monomer phase in the monomer in water emulsion. A polymerization initiator, a surfactant, a chain transfer agent, a chelating agent and a pH adjustor may be added to the monomer in water emulsion. Thus, a water-dispersed resin can be easily obtained, and the desired properties are easily obtained because the resin components can be varied.

The content of the water-dispersed resin added in the ink of the present invention is preferably from 1-40 weight % based on the total weight of the ink composition, and it is more preferably from 1.5-30 weight %, and it is still more preferably from 2-25 weight %.

Even more preferably, the amount of the water-dispersed resin contained in the inkjet ink, as a solid content, is 2.5 weight % to 15 weight %, and more preferably 3 weight % to 7 weight %, relative to the total ink composition.

Inks may comprise additives such as cosolvents and surfactants which are not limited to any kind and may be similar to the cosolvents and surfactants used in reaction liquids according to the present invention as described above.

An ink set according to the present invention comprises an aqueous reaction liquid composition according to the present invention and an ink composition as described above.

Printing Method

An aqueous reaction liquid composition according to the present invention can be applied to a print substrate by means of any application method, in particular ink jet printing. A printing method is for example disclosed in published International Patent Application WO2013/131924, which is hereby incorporated by reference.

EXAMPLES

Materials

All chemicals used in the examples were obtained from Sigma Aldrich, unless stated otherwise. All chemicals were used as received, unless stated otherwise.

Surfactants

| Trade name | type | Supplier |
|---|---|---|
| Dynol ® 607 | ethoxylated acetylene glycol (alkoxylated alcohol) | Air Products |
| Dynol ® 604 | ethoxylated acetylene glycol (alkoxylated alcohol) | Air Products |
| Capstone ® FS3100 | fluoro surfactant | DuPont |
| Surfynol ® 440 | ethoxylated acetylene glycol (alkoxylated alcohol) | Air Products |
| Surfynol ® 465 | ethoxylated acetylene glycol (alkoxylated alcohol) | Air Products |
| TEGO ® Wet 500 | alkoxylated alcohol | Evonik |
| Tomamine ® alkali | dipropionate amphoteric surfactant | Air Products |
| Betadet ® HR | Cocamidopropyl betaine | Kao Chemicals |

Print Substrates

The print substrates used in the examples are machine coated (MC)) media Hello matt (115 $g/m^2$, A4) obtained from Buhrman Ubbens, Hello gloss (115 $g/m^2$) obtained from Buhrman Ubbens, Hello gloss Karton (300 $g/m^2$) obtained from Buhrman Ubbens, Profimat (Holzfrei Bilderdruck) (115 $g/m^2$) obtained from Igepa and Loxoart (Samt Offset) (170 $g/m^2$) obtained from Papyrus.

Methods

Dot Spread

The primer is colorless, this makes it difficult to measure the dotspread of the reaction liquid on the print substrate. Therefore, a dye (0.01 wt % basonyl red dye) is added to the reaction liquid. By adding this dye, it is possible to measure the colored dots with a fluorescence filter on a microscope. The dot diameter of the primer dots on paper is measured.

The reaction liquid is jetted with a Kyocera KJB4 print head; smallest droplet size 1 (around 3 pl). The droplet volume is determined by printing a predetermined amount of droplets with all the nozzles. The weight loss in the reaction liquid container bottle is measured and the density is determined (around 1.14 g/l). With the weight loss, density and amount of droplets, the (single) droplet volume can be calculated. From the droplet volume, the droplet diameter in air is calculated.

The spread factor (Sf) is calculated by droplet diameter (on the print substrate, e.q. Paper) divided by droplet diameter in air.

Comparative Examples A-E: Preparation of a Reaction Liquid Outside the Scope of the Present Invention 21.2 grams of glycerin (obtained from KAO), 18.5 grams of Magnesium pidolate, 0.5 grams of a surfactant as indicated in Table 1, and a balance amount of UHQ water were mixed. 100 grams of reaction liquid was obtained, the compositions of which are shown in Table 1.

Comparative Example F: Preparation of a Reaction Liquid Outside the Scope of the Present Invention Comparative Example A was repeated. Magnesium pidolate was replaced by Magnesium acetate. The composition is shown in Table 1.

Comparative Example G: Preparation of a Reaction Liquid Comprising an Amphoteric Surfactant as a Sole Surfactant Comparative Example A was repeated by replacing the surfactant with 2 wt % of Tomamine® alkali surfactant (amphoteric). The amount of water was adjusted accordingly. The composition as shown in Table 1 was obtained.

Examples 1-3: Preparation of a Reaction Liquid According to the Present Invention Comparative Examples A-C were repeated and Tomamine® alkali surfactant (amphoteric) was added in the amounts indicated in Table 1.

Example 4: Preparation of a Reaction Liquid According to the Present Invention

Example 1 was repeated with TEGO® Wet 500 instead of Dynol® 607. The amounts of the components were adjusted such that the composition as shown in Table 1 was obtained.

Example 5: Preparation of a Reaction Liquid According to the Present Invention

Comparative Example F was repeated with Dynol 607 instead of Surfynol® 465 and by adding Tomamine® alkali as amphoteric surfactant. The amounts of the components were adjusted such that the composition as shown in Table 1 was obtained.

Example 6: Preparation of a Reaction Liquid According to the Present Invention

Example 1 was repeated with Betadet® HR instead of Tomamine® alkali as amphoteric surfactant. The obtained composition is shown in Table 1.

TABLE 1 compositions of reaction liquids according to Comparative Examples A-G and Examples 1-6

|  |  | Comparative Examples, amounts (wt %) |  |  |  |  |  |  |
|---|---|---|---|---|---|---|---|---|
| component |  | A | B | C | D | E | F | G |
| cosolvent | glycerin | 21.2 | 21.2 | 21.2 | 21.2 | 21.2 | 8.7 | 21.2 |
|  | propylene glycol |  |  |  |  |  | 8.7 |  |
| salt | Mg-pidolate | 18.5 | 18.5 | 18.5 | 18.5 | 18.5 |  | 19.1 |
|  | Mg-acetate |  |  |  |  |  | 24.2 |  |
| 'second' surfactant | Dynol ® 607 | 0.5 |  |  |  |  |  |  |
|  | Dynol ® 604 |  | 0.5 |  |  |  |  |  |
|  | Capstone ® FS3100 |  |  | 0.5 |  |  |  |  |
|  | Surfynol ® 440 |  |  |  | 0.5 |  |  |  |
|  | Surfynol ® 465 |  |  |  |  | 0.5 | 0.5 | 0.4 |
|  | TEGO ® Wet 500 |  |  |  |  |  |  |  |
| 'first' surfactant (amphoteric) | Tomamine ® alkali |  |  |  |  |  |  | 2.0 |
|  | Betadet ® HR |  |  |  |  |  |  |  |
|  | water | balance to 100 wt % |  |  |  |  |  |  | compositions of reaction liquids according to Comparative Examples A-G and Examples 1-7

|  |  | Examples, amounts (wt %) |  |  |  |  |  |
|---|---|---|---|---|---|---|---|
| component |  | 1 | 2 | 3 | 4 | 5 | 6 |
| cosolvent | glycerin | 21.2 | 20.4 | 17.9 | 20.5 | 16.5 | 19.8 |
|  | propylene glycol |  |  |  |  |  |  |
| salt | Mg-pidolate | 18.5 | 18.2 | 19.4 | 18.3 |  | 18.5 |
|  | Mg-acetate•4H2O |  |  |  |  | 22.6 |  |
| 'second' surfactant | Dynol ® 607 | 0.5 |  |  |  | 1.0 | 0.5 |
|  | Dynol ® 604 |  | 0.5 |  |  |  |  |
|  | Capstone ® FS3100 |  |  | 1.8 |  |  |  |
|  | Surfynol ® 440 |  |  |  |  |  |  |
|  | Surfynol ® 465 |  |  |  |  |  |  |
|  | TEGO ® Wet 500 |  |  |  | 0.5 |  |  |
| 'first' surfactant (amphoteric) | Tomamine ® alkali | 1.6 | 3.2 | 2.5 | 2.6 | 2.3 |  |
|  | Betadet ® HR |  |  |  |  |  | 2.0 |
|  | water | balance to 100 wt % |  |  |  |  |  |

Example 7: Dot Spreading of the Reaction Liquids According to Comparative Examples F and G and Examples 1-5 on Several Machine Coated Media Printing experiments with the reaction liquids according to Comparative Examples F and G and Examples 1-5 (to which a small amount of dye was added) were performed according to the above described method. Spread factors (Sf) were determined. The results are summarized in Table 2.

TABLE 2

Spread factors (Sf) of reaction liquids on several MC-media

| Example | Spread factor (Sf) | | | | |
|---|---|---|---|---|---|
| | Hello matt 115 g/m2 | Hello gloss 115 g/m2 | Hello gloss 300 g/m2 | Loxoart Samt Offset 170 g/m2 | Profimat 115 g/m2 |
| F | 2.5 | 2.3 | n.d. | n.d. | n.d. |
| G | 2.0 | 2.2 | n.d. | 2.3 | 2.1 |
| 1 | 3.0 | 3.1 | 3.5 | 3 | 3.7 |
| 2 | 3 | 2.9 | 3.5 | 2.8 | 2.8 |
| 3 | 3 | 2.9 | 3.5 | 2.8 | 2.8 |
| 4 | 2.7 | 2.4 | 2.8 | 2.8 | 3.2 |
| 5 | 3.1 | n.d. | n.d. | 2.8 | 3.4 | n.d. = not determined

The appearance of the reaction liquids according to Comparative Examples A-E were qualified as "cloudy" liquids, indicating the non-compatibility of the components of the reaction liquids. Examples 1-3 contained similar amounts of the 'second' surfactant compared to Examples A-C, respectively. An amphoteric surfactant was added until the compositions became clear solutions, indicating that the amphoteric surfactant may act as a compatibilizer towards the 'second' surfactant.

The reaction liquids according to Comparative Examples A-E are not suitable to be applied by jetting and/or show insufficient spreading on print substrates (are not effective).

Table 2 shows that although some of the surfactants (Surfynol® 465 is shown, Comparative Example F, Tables 1 and 2) are compatible with some salts in a high concentration (Mg-acetate in Comparative Example F), the spreading on a print substrate is limited (i.e. 2.5 or lower).

Table 2 further shows the spread factor of the reaction liquids according to Comparative Examples F and G and Examples 1-5 on several MC-media. The average spread factor of the reaction liquid according to Comparative Example G is 2.1. The reaction liquid according to Comparative Example G comprises an amphoteric surfactant as a sole surfactant. Examples 1-5 all comprise an amphoteric surfactant (also used as a compatibilizer) and a 'second' surfactant. Table 2 clearly shows that the spread factor increases with respect to Comparative Example G. Therefore, by using an amphoteric surfactant the compatibility towards a second surfactant increases. The surface tension of the reaction liquid can be optimized and spreading behavior can be significantly improved.

Although specific embodiments of the invention are illustrated and described herein, it will be appreciated by those of ordinary skill in the art that a variety of alternate and/or equivalent implementations exist. It should be appreciated that the exemplary embodiment or exemplary embodiments are examples only, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

The invention claimed is:

1. An aqueous reaction liquid composition, comprising:
   a metal salt;
   a first surfactant being an amphoteric surfactant; and
   a second surfactant being a non-ionic surfactant.

2. The aqueous reaction liquid composition according to claim 1, wherein the amphoteric surfactant is selected from the group consisting of
   cocamidopropylenebetaine,
   lauryldimethylamine oxide,
   larylbetaine,
   stearylbetaine,
   hydroxysultains,
   sodiumcocoamphopropionate and
   dipropionate amphoteric surfactants.

3. The aqueous reaction liquid composition according to claim 1, wherein the first surfactant is present in an amount of between 0.5 wt % and 5 wt %, relative to the total aqueous reaction liquid composition.

4. The aqueous reaction liquid composition according to claim 1, wherein the second surfactant is present in an amount of between 0.1 wt % and 2 wt %, relative to the total aqueous reaction liquid composition.

5. The aqueous reaction liquid composition according to claim 1, wherein a mass ratio of the first surfactant relative to the second surfactant is between 1 and 6.

6. The aqueous reaction liquid composition according to claim 1, wherein the metal salt comprises a salt of a conjugate base of an organic acid.

7. The aqueous reaction liquid composition according to claim 6, wherein the organic acid is selected from formic acid or an organic acid comprising at least one stereogenic center and having a molecular weight of below 200 g/mol.

8. The aqueous reaction liquid composition according to claim 6, wherein the organic acid is an amino acid.

9. The aqueous reaction liquid composition according to claim 1, wherein the metal salt comprises a metal ion as a cation.

10. The aqueous reaction liquid composition according to claim 6, wherein the organic acid is selected from the group consisting of formic acid, ascorbic acid, glutamic acid and pidolic acid.

11. An ink set, comprising:
    an aqueous reaction liquid composition according to claim 1; and
    an ink composition comprising dispersed particles that destabilize upon contact with the metal salt in the reaction liquid.

12. The ink set according to claim 11, wherein the dispersed particles in the aqueous reaction ink composition comprise pigment particles and/or latex particles.

13. A method of printing, comprising:
    applying an aqueous reaction liquid composition according to claim 1 to a surface of a print substrate; and
    applying an ink composition to a surface of the print substrate, wherein the ink composition comprises dispersed particles that destabilize upon contact with the metal salt in the aqueous reaction liquid composition.

14. Method of printing according to claim 13, wherein the aqueous reaction liquid composition is first applied to the surface of the print substrate and subsequently the ink composition is applied to the surface of the print substrate.

15. The method according to claim 13, wherein the aqueous reaction liquid composition is applied by ink jet.

16. The aqueous reaction liquid composition according to claim 9, wherein the metal ion is a polyvalent metal ion selected from the group consisting of $Ca^{2+}$, $Mg^{2+}$, $Sr^{2+}$, $Zn^{2+}$, $Cu^{2+}$, $Ni^{2+}$, $Fe^{3+}$, $Cr^{3+}$ and $Al^{3+}$.

17. The aqueous reaction liquid composition according to claim 9, wherein the metal ion is a monovalent metal ion selected from the group consisting of $Li^+$, $Na^+$, $K^+$, $Hg^+$, $Cu^+$ and $Ag^+$.

18. The aqueous reaction liquid composition according to claim 1, wherein the non-ionic surfactant is selected from the group consisting of
    alkoxylated alcohols,
    fluorosurfactants,
    hydrophilic silicone surfactants and
    polyethyleneoxides.

19. The aqueous reaction liquid composition according to claim 18, wherein the non-ionic surfactant is a hydrophilic silicone surfactant selected from the group consisting of polyalkylene oxide modified silicones and polyether modified silicones.

20. The aqueous reaction liquid composition according to claim 1, wherein the metal salt is present in an amount between 10 wt % and 60 wt %, relative to the total aqueous reaction liquid composition.

\* \* \* \* \*